Nov. 23, 1937.  C. H. KNUDSEN  2,099,852
INTERNAL COMBUSTION ENGINE
Filed Jan. 23, 1936  2 Sheets-Sheet 1
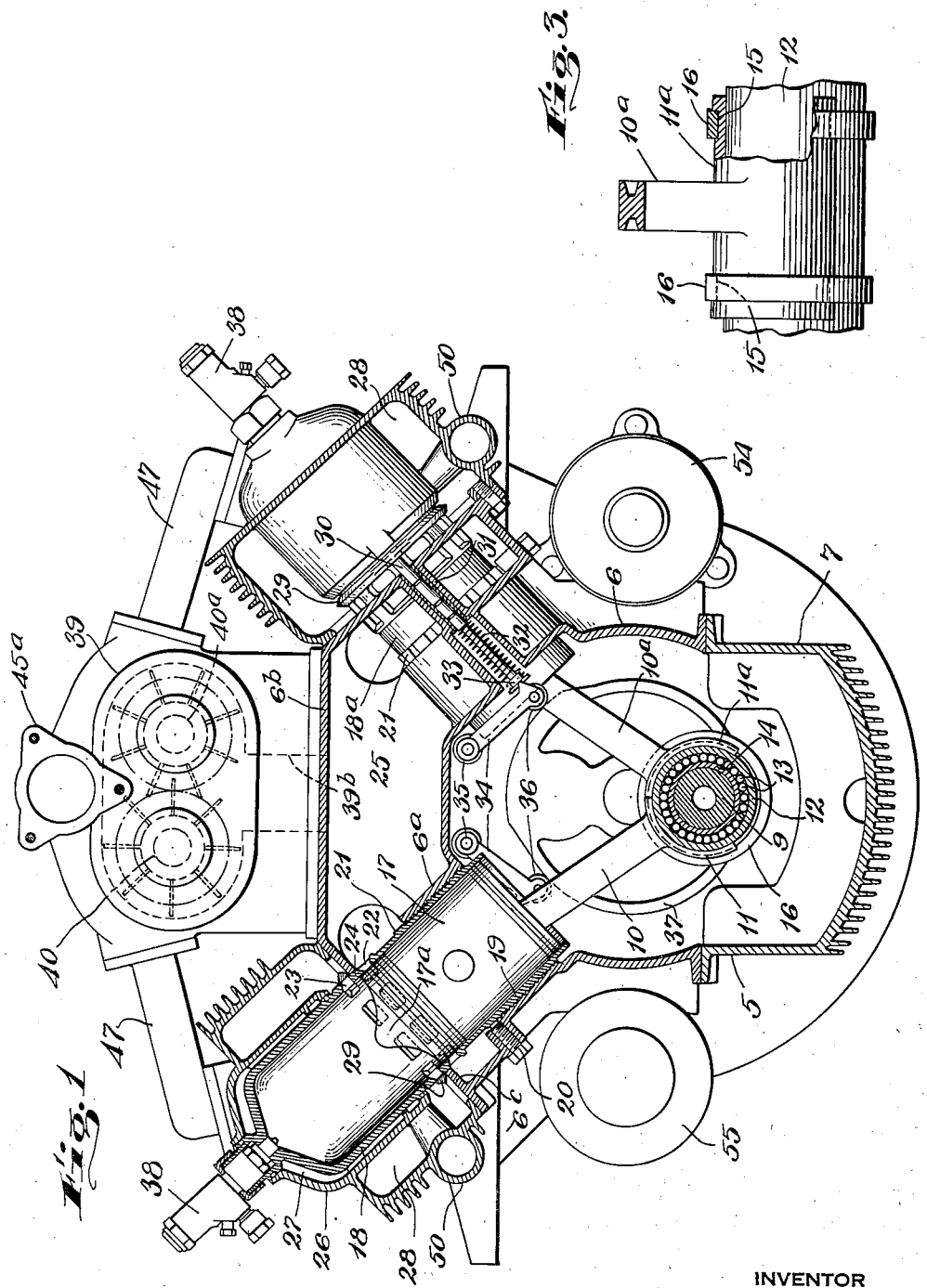
INVENTOR
CARL H. KNUDSEN
BY
ATTORNEY

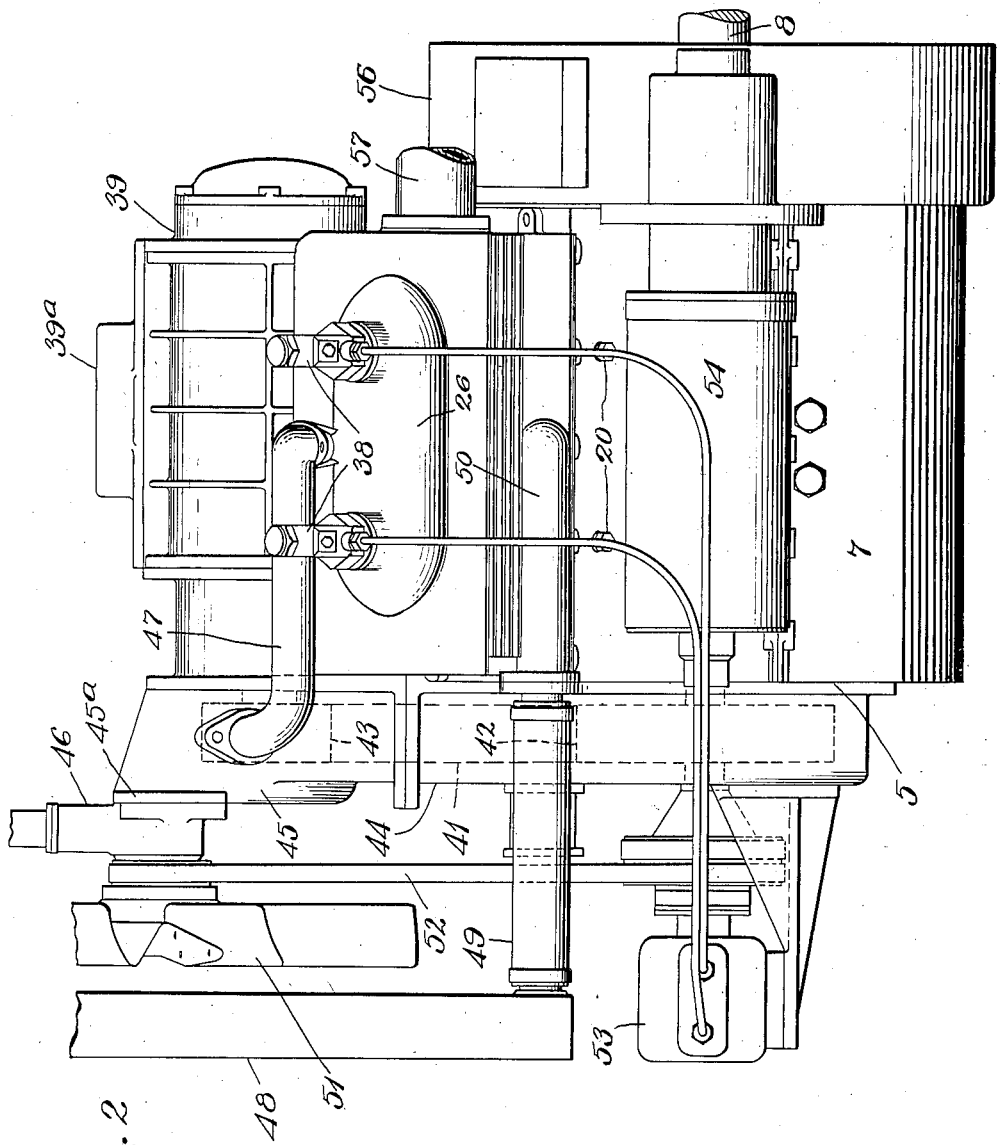

UNITED STATES PATENT OFFICE 2,099,852

INTERNAL COMBUSTION ENGINE

Carl H. Knudsen, Brooklyn, N. Y., assignor to Viking Diesel Motor Corporation, New York, N. Y., a corporation of New York Application January 23, 1936, Serial No. 60,360

9 Claims. (Cl. 123—195)

This invention relates to internal combustion engines and particularly engines of this class of the fuel oil type; and the object of the invention is to provide an improved method of constructing the cylinders proper of the engine and for mounting the same in connection with their supports, and especially in the provision of an engine, the cylinders of which are adjustable in their supports to regulate the area of the combustion space so as to provide the most efficient engine operation; a further object being to provide an improved method of mounting and operating a ring type valve which slidably engages the cylinder wall and controls the opening and closing of the exhaust ports of the engine; a still further object being to provide in an engine of the type illustrated a novel arrangement of cylinders and mounting of the connecting rods in connection with the crank shaft of the engine; and with these and other objects in view, the invention consists in an engine of the class described having the design and arrangement of parts and mechanisms more fully hereinafter described and claimed.

The invention is fully disclosed in the following specification, of which the accompanying drawings form a part, in which the separate parts of my improvement are designated by suitable reference characters in each of the views, and in which:

Fig. 1 is a broken, transverse sectional view of the engine, showing one of the cylinders in section and the other partially in elevation.

Fig. 2 is a side view of the engine diagrammatically illustrating the general arrangement of parts in one installation or use of the engine; and, Fig. 3 is a detail sectional view of a part of the construction shown in Fig. 1.

For the purpose of illustrating one method of carrying my invention into effect, I have shown in the accompanying drawings one arrangement or design of engine which, as will appear, is of a V-type and consists of two pairs of cylinders, diagrammatically illustrated in an assemblage suitable for use on motor vehicles, aeroplanes, tractors and like apparatus. In the drawings, 5 represents the crank case housing consisting of an upper cylinder portion 6 and a lower cover portion 7. At 8, I have indicated the engine shaft and at 9 one of the cranks of said shaft.

In the construction shown, the connecting rods 10, 10a, of opposed cylinders in each pair have arc-shaped shoe portions 11, 11a which fit and operate upon a bearing sleeve 12, inwardly of which is a series of roller bearings 13 which also operate upon an inner sleeve 14 mounted upon the crank pin 9. The shoe portions 11, 11a project at opposite sides of the connecting rods, and in Fig. 3 of the drawings I have illustrated the shoe portion 11a of the rod 10a. These shoe portions are provided adjacent their opposite side edges with grooves 15 in which rings 16 are mounted. The rings serve to couple the shoe portions of opposed rods together and support them on the pin bearing, and at the same time, permit relative movement of said shoe portions to compensate for the different angular positions of the connecting rods during the cycle of revolution of the crank of the engine.

At the left of Fig. 1 of the drawings, I have shown at 17 one of the pistons of the engine operating in the cylinder 18. At 18a, I have shown the opposed cylinder. As these cylinders are of the same construction, the brief description of one will apply to both. Each cylinder has an externally threaded inner end portion 19 adapted to engage an internally threaded cylinder portion 6a of the part 6 to provide adjustable mounting of the cylinder 18. The cylinder is held in different positions of adjustment by a set screw 20 engaging a slotted or grooved circumferential portion 21 on the cylinder immediately beyond the threaded portion 19 thereof. Substantially centrally of the cylinder are two sets of circumferentially spaced ports or passages 22 and 23. The ports 22 constitute the scavenging or intake ports and the ports 23 the exhaust ports. These ports are subdivided by an intermediate annular bearing portion 24 upon which seats a part of the housing 6b of the cylinder crank case part 6, the housing 6b forming a large air supply chamber 25 which extends around each of the cylinders to supply air to all of the intake ports 22 as will appear upon a consideration of Fig. 1 of the drawings. The outer wall 6c of the housing 6b seats upon the annular wall portion 24 of the cylinder as may be clearly seen at the left of Fig. 1 of the drawings. At 26, I have shown the outer supplemental and stationary cylinder portion which forms the water jacket 27 at the outer or head end portion of the cylinder and the exhaust chamber 28 which communicates with the exhaust ports 23.

Slidably mounted upon the cylinders proper adjacent the exhaust ports 23 is a ring valve 29 preferably of the cross section shown in Fig. 1 of the drawings. This valve is enlarged at opposite sides to receive and support push rods 30 which extend down through suitable bearings 31 formed in the housing 6b. The inner ends of the rods 30 are reduced and mounted on the reduced ends, are springs 32 engaging heads 33 at the lower ends of the rods to support the rods in engagement with operating arms 34 pivoted in the housing as indicated at 35, and carrying at their free ends rollers 36 which operate upon cams 37 arranged on the shaft 8 at opposite sides of the crank 9. The cams 37 serve to move the valves 29 into open position as shown at the right of Fig. 1 as well as to maintain the valves in closed position as indicated at the left of Fig. 1 for the required periods of time consistent with the operation of the pistons in the respective cylinders.

At 38, I have indicated the fuel injecting valves which are supported in connection with the upper head ends of the cylinders proper and by means of which fuel under pressure may be introduced into the cylinders in the operation of the engine.

Intermediate the upper ends of the cylinders is an air supply pump 39 consisting of two rotors 40, 40a, the shaft of one of which is in operative engagement with the crank shaft of the engine, preferably through a chain drive indicated in dotted lines at 41 in Fig. 2 of the drawings engaging a sprocket 42 on the crank shaft and a sprocket 43 on one of the rotor shafts. This drive is preferably contained in housings 44, 45, the latter also serving to support a water pump 46 and including a water circulating passage with which the water manifolds 47 communicate. The pump 46 is in communication with the upper end of a radiator 48, the lower portion of which is indicated in Fig. 2 of the drawings. To the lower end of the radiator are coupled water circulating pipes 49 which communicate with the water intake manifolds 50 which extend through the exhaust chambers 28 and communicate with the water jacket 27 as is clearly indicated in Fig. 1 of the drawings. The water pump 46 is coupled with the flange 45a of the housing 45 as will appear from a consideration of Figs. 1 and 2 of the drawings.

Mounted on the shaft of the pump 46 is the cooling fan 51. This shaft is preferably driven by a belt 52 directly from the crank shaft 8. This shaft may also be utilized in operating the fuel supply pump 53 which supplies fuel to the respective injector nozzles 38. A starter device 54 and a generator 55 are mounted at opposite sides of the engine. The shaft of the generator is in operative connection with the engine, whereas, the starter shaft operates upon a geared fly wheel contained in the housing 56. For example, a conventional Bendix starter unit may be employed. However, as these features of the engine form no direct part of the invention, they are not shown in detail, and are merely described briefly to illustrate the general arrangement of the parts or mechanism of the engine. This also applies to the illustration of the fuel injecting valves and the fuel, air and water pumps.

Air is admitted into the air supply pump 39 at 39a and is discharged into the chamber 25 through the passage indicated at 39b in Fig. 1 of the drawings. The pressure of air for supply to the respective cylinders and which is exposed to the intake ports 22 thereof is of relatively low pressure, sufficient to provide for the scavenging of the cylinders and to supply air under pressure to the cylinders at the beginning of the compression stroke of the pistons in the cylinders. In Fig. 2 of the drawings, I have indicated at 57 one of the exhaust manifolds. One of these manifolds will be disposed at each side of the engine for discharge of the exhaust or burnt gases from the exhaust passages 28.

In the operation of the engine, starting with the piston at the innermost end of piston travel, in which position the exhaust ports 23 are still open and the intake ports full open, as the piston starts its upward or outward compression stroke, the exhaust ports are first closed by inward movement of the ring valve 29 and air under pressure from the chamber 25 is admitted into the cylinder above the piston through the intake ports 22 until such time as the ports are closed by the piston, thereby starting the compression stroke with a fully charged cylinder. On the downward or firing stroke of the piston, the ring valve 29 is moved into open position just prior to the registration of the upper end of the piston with the exhaust ports, after which said exhaust ports are uncovered by the piston to allow the exhaust or burnt gases to pass into the exhaust chamber 28 and out through the manifold 57 after which the intake ports 22 are uncovered to allow the scavenging air to pass into the cylinder. This air is guided to the central portion of the cylinder by the upwardly extending conical head 17a of the piston, and this initial scavenging charge of air serves to thoroughly clean out the burnt gases through the exhaust port. It will appear from a consideration of the cross section of the cylinder 18 shown at the left of Fig. 1 of the drawings that the walls of the intake passages 22 are made slightly conical in form to produce a nozzle effect which will materially aid in creating the desired path or passage of the air upwardly through the central portion of the cylinder and downwardly along the walls thereof to the exhaust ports. When the piston has reached the lowermost point of piston travel, the above cycle of operation is again repeated.

In the above operation, the cams 37 will operate the ring valves 29 through the rods and arms employed to control the opening and closing of the exhaust ports as clearly set forth. By moving these ring valves outwardly beyond the ports on the cylinder, a support is provided for the cylinder intermediate the intake and exhaust passages, that is to say, a support between the annular portion 24 of the cylinder and the outer wall 6c of the housing 6b.

In the operation of the engine, the shoe portions 11, 11a of the connecting rods will move into different positions circumferentially on the sleeve 14 to compensate for the different angularities of the rod in each cycle of revolution. The adjustment of the cylinders 18, 18a is but slight in either direction and will not interfere with the respective intake and exhaust passages but will, nevertheless, provide means for increasing or decreasing the area of the combustion space in the respective cylinders to produce the most efficient operations, and furthermore, a balanced operation as between the respective cylinders in a group constituting an engine unit. In this way, slight variations in the commercial construction of the associated parts of the cylinder and piston may be compensated for without the necessity of minute calculations in the form of said associated parts.

The illustration of the engine in the accompanying drawings is merely illustrative of one possible assemblage or arrangement of cylinders, and this may be varied to suit the desired design and power output desired as well as the particular installation required. It is understood that the fundamental principles of the cylinder construction of the engine are applicable to engines of various types and designs.

Having fully described my invention, what I claim as new and desire to secure by Letters Patent, is:—

1. An internal combustion engine comprising an elongated cylinder, said cylinder having centrally thereof circumferentially spaced exhaust ports and in close proximity thereto circumferentially spaced intake ports, a ring valve mounted upon the outer surface of the cylinder and movable longitudinally thereof to open and close said exhaust ports, said valve being in operative connection with the crank shaft of the engine, and said valve being movable outwardly in the direction of the head end portion of the cylinder in the operation of opening said exhaust ports.

2. An internal combustion engine comprising an elongated cylinder, said cylinder having centrally thereof circumferentially spaced exhaust ports and in close proximity thereto circumferentially spaced intake ports, a ring valve mounted upon the outer surface of the cylinder and movable longitudinally thereof to open and close said exhaust ports, said valve being in operative connection with the crank shaft of the engine, said valve being movable outwardly in the direction of the head end portion of the cylinder in the operation of opening said exhaust ports, a cylinder casing enclosing said cylinder, and means on said casing engaging the outer wall of the cylinder intermediate the intake and exhaust ports for supporting said cylinder and dividing the casing into intake and exhaust chambers registering with the respective ports.

3. An internal combustion engine comprising an elongated cylinder, said cylinder having centrally thereof circumferentially spaced exhaust ports and in close proximity thereto circumferentially spaced intake ports, a ring valve mounted upon the outer surface of the cylinder and movable longitudinally thereof to open and close said exhaust ports, said valve being in operative connection with the crank shaft of the engine, said valve being movable outwardly in the direction of the head end portion of the cylinder in the operation of opening said exhaust ports, a cylinder casing enclosing said cylinder, and means on said casing engaging the outer wall of the cylinder intermediate the intake and exhaust ports for supporting said cylinder and dividing the casing into intake and exhaust chambers registering with the respective ports, a part of said casing including a water jacket encircling the head end portion of the cylinder.

4. An internal combustion engine comprising an elongated cylinder, said cylinder having centrally thereof circumferentially spaced exhaust ports and in close proximity thereto circumferentially spaced intake ports, a ring valve mounted upon the outer surface of the cylinder and movable longitudinally thereof to open and close said exhaust ports, said valve being in operative connection with the crank shaft of the engine, said valve being movable outwardly in the direction of the head end portion of the cylinder in the operation of opening said exhaust ports, a cylinder casing enclosing said cylinder, means on said casing engaging the outer wall of the cylinder intermediate the intake and exhaust ports for supporting said cylinder and dividing the casing into intake and exhaust chambers registering with the respective ports, a part of said casing including a water jacket encircling the head end portion of the cylinder, and said ring valve having operating rods arranged at opposite sides of the cylinder and the other part of said casing having bearings in which said rods are mounted.

5. A V-type fuel oil engine of the class described comprising a single crank shaft with diverging cylinders having pistons operating from said crank shaft, said cylinders having intake and exhaust ports substantially centrally thereof controlled by the pistons operating in said cylinders, portless ring valves slidably mounted upon the outer surface of the wall of the cylinders for controlling the exhaust ports independent of said pistons so as to close the exhaust ports in advance of the closing of the intake ports by said pistons at the beginning of the compression stroke of the respective pistons, a large air admission chamber arranged intermediate the cylinders and extending to and encircling that part of opposed cylinders having the intake ports therein, and independent cylinder casings mounted upon the outer end portions of said cylinders and including exhaust chambers registering with the exhaust ports of said cylinders.

6. An internal combustion engine of the class described comprising a crank case including an upper cylinder portion, a cylinder attached to and projecting outwardly from said cylinder portion, the length of said cylinder being substantially equal to the full length of piston travel, the outer end of said cylinder including an integral head having means for supporting a fuel injecting valve in connection therewith, the upper end of the cylinder portion of the crank case forming a large air intake chamber, a supplemental cylinder casing mounted upon the crank case cylinder portion and encircling the cylinder and outer head end portion of the cylinder and forming the exhaust chamber of the engine, means engaging the cylinder for subdividing the intake and exhaust chambers, and said cylinder having circumferentially spaced intake and exhaust ports arranged at opposite sides of said last named means and registering with the respective intake and exhaust chambers.

7. An internal combustion engine of the class described comprising a crank case including an upper cylinder portion, a cylinder attached to and projecting outwardly from said cylinder portion, the length of said cylinder being substantially equal to the full length of piston travel, the outer end of said cylinder including an integral head having means for supporting a fuel injecting valve in connection therewith, the upper end of the cylinder portion of the crank case forming a large air intake chamber, a supplemental cylinder casing mounted upon the crank case cylinder portion and encircling the cylinder and outer head end portion of the cylinder and forming the exhaust chamber of the engine, means engaging the cylinder for subdividing the intake and exhaust chambers, said cylinder having circumferentially spaced intake and exhaust ports arranged at opposite sides of said last named means and registering with the respective intake and exhaust chambers, and a portless ring valve slidably engaging the cylinder and operating solely in said exhaust chamber for controlling the opening and closing of said exhaust ports.

8. An internal combustion engine of the class described comprising a crank case including an upper cylinder portion, a cylinder attached to and projecting outwardly from said cylinder portion, the length of said cylinder being substantially equal to the full length of piston travel, the outer end of said cylinder including an integral head having means for supporting a fuel projecting valve in connection therewith, the upper end of the cylinder portion of the crank case forming a large air intake chamber, a supplemental cylinder casing mounted upon the crank case cylinder portion and encircling the cylinder and outer head end portion of the cylinder and forming the exhaust chamber of the engine, means engaging the cylinder for subdividing the intake and exhaust chambers, said cylinder having circumferentially spaced intake and exhaust ports arranged at opposite sides of said last named means and registering with the respective intake and exhaust chambers, a portless ring valve slidably engaging the cylinder and operating solely in said exhaust chamber for controlling the opening and closing of said exhaust ports, and said supplemental cylinder casing forming in conjunction with the cylinder a water jacket independent of the exhaust chamber and encircling the outer and head end portions of the cylinder.

9. An internal combustion engine comprising an elongated cylinder, said cylinder having centrally thereof circumferentially spaced exhaust ports and in close proximity thereto circumferentially spaced intake ports, a portless ring valve mounted directly upon the outer surface of the cylinder proper and movable longitudinally thereof to open and close said exhaust ports, said valve being in operative connection with the crank shaft of the engine, intake and exhaust chambers encircling the cylinder and registering with the intake and exhaust ports thereof, said intake ports flaring outwardly into the intake chamber, and the upper and lower edges of the ring valve being beveled outwardly to provide a substantially triangular cross sectional form to said ring.

CARL H. KNUDSEN.